United States Patent [19]

Bundschuh

[11] 3,920,263
[45] Nov. 18, 1975

[54] OCCUPANT-PROPELLED VEHICLE

[75] Inventor: Robert L. Bundschuh

[73] Assignees: Lionel C. Martin, both of West Simsbury, Conn.; Mitsui Mining & Smelting Co., Ltd., Tokyo, Japan

[22] Filed: Mar. 6, 1973

[21] Appl. No.: 338,643

[52] U.S. Cl............... 280/106; 280/236; 296/35 R
[51] Int. Cl.²................... B60G 1/04; B62D 21/00
[58] Field of Search .......... 280/1.11, 236, 269, 261, 280/237, 238, 251, 282, 106.5 A, 106; 296/31 P, 35 A, 35 R; 301/124 H, 125

[56] References Cited
UNITED STATES PATENTS

| | | | |
|---|---|---|---|
| 1,410,245 | 3/1922 | Enache | 280/269 X |
| 1,562,553 | 11/1925 | Hansen | 280/215 |
| 1,845,044 | 2/1932 | Curry | 280/251 X |
| 1,991,619 | 2/1935 | Mackenzie | 280/106.5 A |
| 2,177,793 | 10/1939 | Taylor | 280/215 |
| 2,228,732 | 1/1941 | Rabe | 280/106.5 A X |
| 3,550,948 | 12/1970 | Thompson | 296/31 P X |

*Primary Examiner*—Leo Friaglia
*Assistant Examiner*—R. Schrecengost
*Attorney, Agent, or Firm*—Roylance, Abrams, Berdo & Kaul

[57] ABSTRACT

An occupant-propelled vehicle including a frame and running gear so constructed that the total weight of the vehicle can be kept within limits which make it possible for the occupant to propel the vehicle at reasonable speeds. The frame includes a longitudinal main beam and front and rear transverse members secured thereto, with an upright bracket secured to each end of each transverse member for attachment of a body shell and to support outboard antifriction bearings for two independent rear axles, the inner ends of the rear axles being journalled in antifriction bearings supported on the main beam.

8 Claims, 12 Drawing Figures

OCCUPANT-PROPELLED VEHICLE

RELATED APPLICATIONS

This application discloses subject matter claimed in copending application Ser. No. 338,641, filed concurrently herewith by Robert L. Bundschuh as a continuation-in-part of application Ser. No. 183,147, filed Sept. 23, 1971, by Robert L. Bundschuh, and in copending application Ser. No. 338,644 filed concurrently herewith by Robert L. Bundschuh and Lionel C. Martin. Copending application Ser. No. D-338,642, filed concurrently herewith by Robert L. Bundschuh and Bruce C. Delaplaine is directed to the ornamental design seen in FIG. 1.

BACKGROUND OF THE INVENTION

There has long been a demand for a wheeled vehicle which could be propelled solely by the power of the occupant but which would offer greater comfort and stability than does the bicycle. Many proposals have been made in the prior art for such vehicles, of which U.S. Pat. Nos. 917,684 Van Nort, 941,471 Thibert, 1,500,809 Giufri, 1,562,553 Hansen, 1,683,240 Colvin, 2,177,793 Taylor, 3,429,584 Hendricks, 3,430,982 Despain et al are typical. Despite continued prior-art efforts over many years, no such vehicle has heretofore been successful. There have been numerous difficulties which have prevented success in this art, including particularly the problem of providing a drive system of truly high efficiency. One such difficulty which appears not to have been squarely faced by prior-art workers is that of achieving an adequately low overall vehicle weight without sacrificing unduly comfort, and particularly stability. In the case of a bicycle, adequate strength can be achieved with an overall vehicle weight in the range, e.g., of 30–60 pounds, and such weights are acceptable with conventional bicycle pedal drives. For a general purpose vehicle, however, much greater stability than can be achieved with a bicycle is required, and considerably greater comfort is at least highly desirable. With the usual bicycle pedal drive system, little more than the 60-pound upper figure just mentioned is tolerable if reasonable vehicle speeds are to be achieved over reasonable distances to be travelled. Employing a more efficient drive system, and particularly one having the constant torque characteristics of that described in aforementioned Ser. No. 338,644, overall vehicle weights of, e.g., 90–135 pounds become tolerable. Heretofore, however, no four-wheeled vehicle including a seat, a body shell to enclose the occupant, and acceptable running gear has been proposed.

OBJECTS OF THE INVENTION

A general object of the invention is to devise an occupant-propelled vehicle having the efficiency and stability offered by two driven wheels but which is of such small overall weight that reasonable speeds can be attained within the physical capabilities of the average person.

A further object is to provide such a vehicle having a highly simplified, lightweight frame and improved means for mounting the driven axles in independent fashion.

Another object is to provide such a vehicle which includes a body shell for enclosing the occupant and which is characterized by simple and particularly effective means for mounting the body shell on the frame.

SUMMARY OF THE INVENTION

Considered broadly, vehicles according to the invention have a frame comprising a main longitudinal beam and a transverse frame member located at one end of the frame and rigidly secured to the main beam, the transverse frame member having a plate-like bracket at each end. Two independent driven axles are employed. Each bracket supports an antifriction bearing and that bearing is aligned with a second bearing mounted on the main beam of the frame, the inner end of the axle being journalled in the bearing on the main beam and the axle extending through the bearing carried by the bracket, the driven wheel being secured to the axle outboard of the bracket. The body shell includes side wall portions having openings which clear the driven axles, these side wall portions being secured to the brackets.

In order that the manner in which the foregoing and other objects are achieved according to the invention can be understood in detail, one particular advantageous embodiment of the invention will be described with reference to the accompanying drawings, which form a part of the original disclosure, and in which.

DETAILED DESCRIPTION OF THE INVENTION

Figures 1, 2:
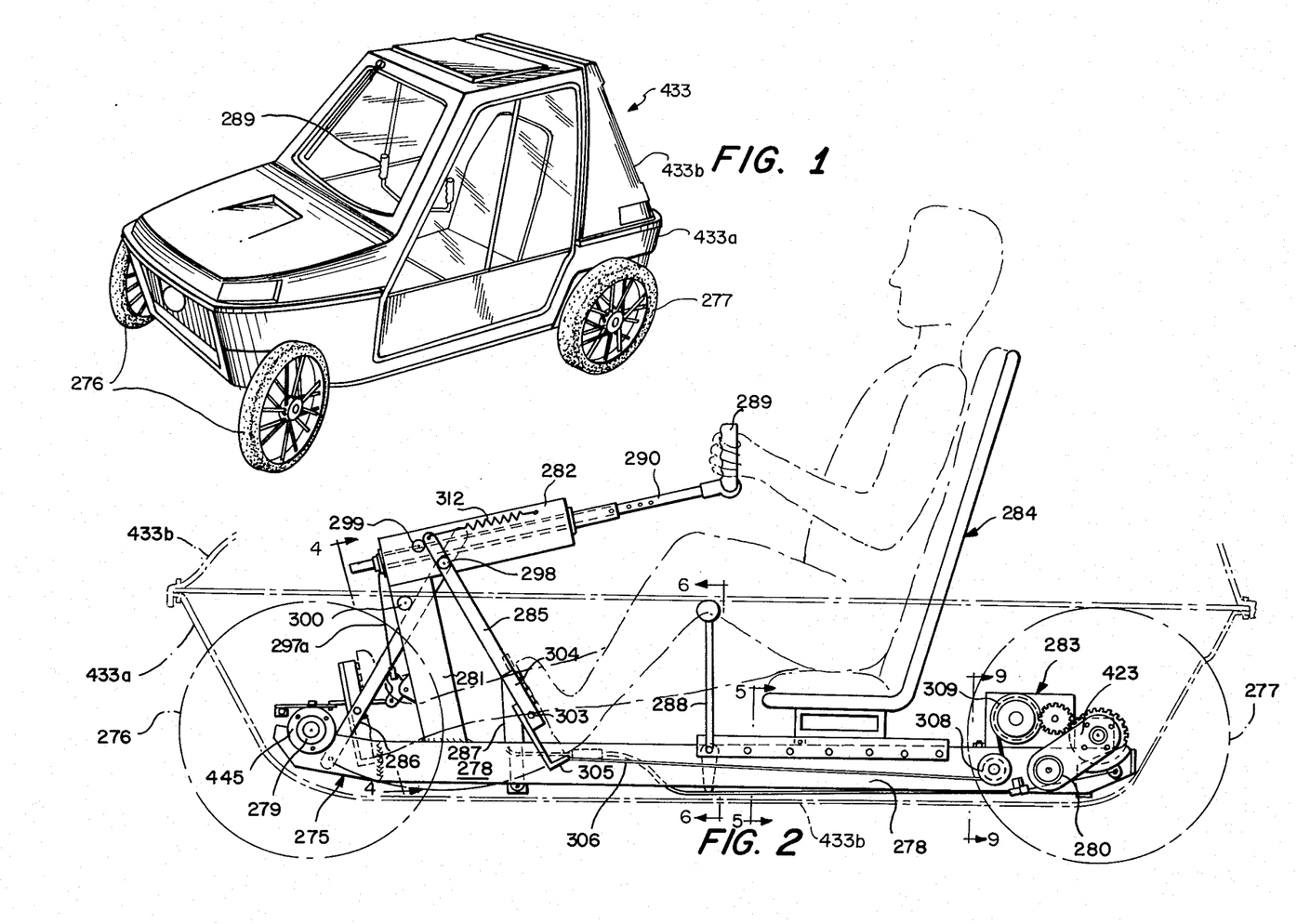
FIG. 1 is a perspective view of a vehicle according to the invention.
FIG. 2 is a side elevational view of the vehicle of FIG. 1.
Figures 3, 10:
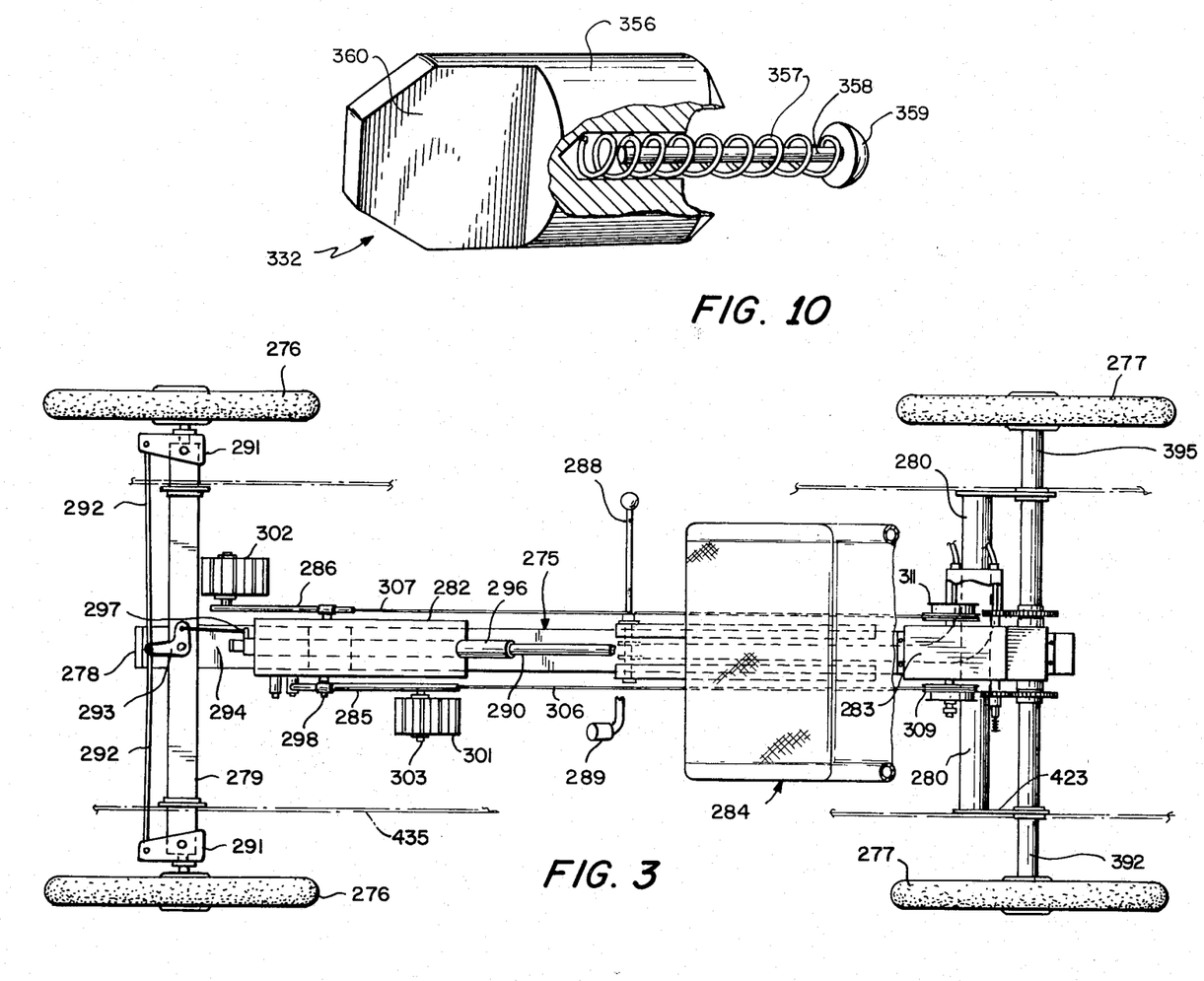
FIG. 3 is a top plan view of the vehicle frame and running gear.
FIG. 10 is a perspective view of a key forming part of the transmission; said
Figure 4:
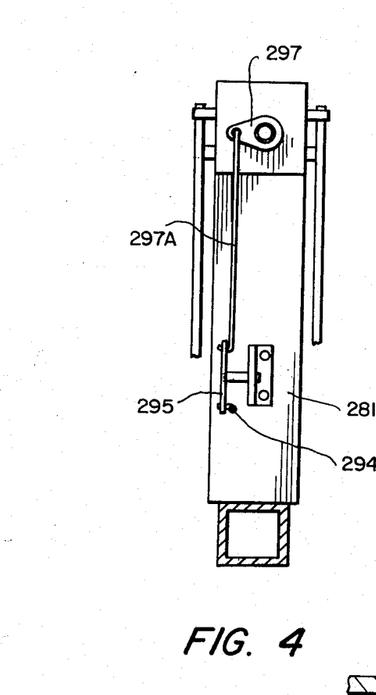
FIGS. 4–6 are transverse views taken generally on lines 4—4, 5—5 and 6—6, FIG. 2.

FIGS. 1–11 illustrate the invention as applied to a vehicle having two driven wheels. As seen in FIGS. 1–3, the vehicle comprises a frame indicated generally at 275 and supported by steerable front wheels 276 and two driven rear wheels 277. Frame 275 consists of a single longitudinal beam 278 in the form of a hollow aluminum extrusion of square transverse cross-section, a tubular front transverse member 279 rigidly secured at its midpoint to beam 278, as by welding, a tubular rear transverse member 280 which extends through beam 278 and is secured rigidly thereto, an upright 281 secured rigidly to beam 278 and projecting upwardly therefrom and a hollow support member 282 of rectangular transverse cross-section secured rigidly to the upper end of upright 281 and projecting rearwardly, and slightly upwardly, therefrom. A change speed transmission 283 is rigidly mounted on the top of beam 278 near the rear end thereof. A seat 284 is mounted on beam 278 just forward of the transmission. Two pedal levers 285 and 286 are pivotally mounted on support member 282 and despend therefrom, each on different side of beam 278. A brake pedal lever 287 is accommodated by centrally located slots in beam 278 and projects upwardly therefrom in a location just to the rear of upright 281. A gear shift lever 288 is journalled on beam 278 and projects upwardly therefrom in a location just forward and to the right of the seat. The steering mechanism includes a yoke type handle 289 secured to a shaft 290 extending through and rotatably supported by member 282.

Front wheels 276 are each supported by an axle carried by a support member 291 which is mounted on the corresponding end of member 279, FIG. 3, for swinging movement about a substantially vertical axis. Support members 291 are connected by the rods 292 to one arm of a bell crank 293 which is mounted on member 279 at the midpoint thereof to pivot about an upright axis. The remaining arm of bell crank 293 is connected by a rod 294 to one arm of a second bell crank 295 which is mounted on upright 281 to pivot about a horizontal axis. Steering shaft 290 is telescopically engaged in a tubular shaft 296 and is releasably secured thereto to provide for adjustment of the position of handle 289 relative to the seat. The combination of shafts 290 and 296 extends longitudinally through support member 282 and is journalled thereon for rotary movement about the common axis of the two shafts. Shaft 296 projects forwardly from member 282 and has rigidly secured thereto a radially projecting lever arm 297. The remaining arm of bell crank 295 is connected to lever arm 297 by rod 297a. Accordingly, rotation of the combination of shafts 290 and 296 by handle 289 is translated into simultaneous swinging movement of axle support members 291 to steer the vehicle.

Pivotal mounting of pedal levers 285, 286 is accomplished by a common shaft 298 extending transversely through the sidewalls of support member 282 and secured thereto in a location below steering shaft 290, the ends of shaft 298 projecting laterally from member 282 and the upper end portions of levers 285, 286 being carried thereby and projecting upwardly therefrom so as to be able to engage rearward motion limiting bumpers 299, FIG. 2, secured to member 282. Forward motion limiting bumpers 300 are secured to the upper end portion of upright 281. Pedal levers 285, 286 are of such length that their lower end portions can traverse an arc beside beam 278. Pedals 301, 302 are identical and are mounted on the lower end portions of the respective levers 285, 286 for swinging movement about a horizontal axis indicated at 303, FIG. 2. Each pedal comprises a tread portion 304, to be engaged by the sole of the user's shoe, and a rearwardly projecting heel support 305 provided to support part of the weight of the user's leg. Pedals 301, 302 are located immediately beside and outwardly of the respective arms 285, 286 and the lower ends of the lever arms extend to a point adjacent heel supports 305. The forward end of a flexible cable 306 is attached to the lower end of lever 285 and a cable 307 is similarly attached to the lower end of lever 286, the cables running rearwardly beside beam 278. Cable 306 extends under an idler pulley 308 mounted on beam 278 and thence upwardly to reel 309 of transmission 283. Similarly, cable 307 runs under idler pulley 310, FIG. 11, and thence upwardly to reel 311 on the opposite side of the transmission. A tension spring 312, FIG. 10, is connected between the upper end of pedal lever 285 and a point on member 282 rearwardly of pivot shaft 298, to bias lever 285 to swing pedal 301 forwardly. Lever 286 is equipped with a biasing spring in the same fashion.

Figure 7:
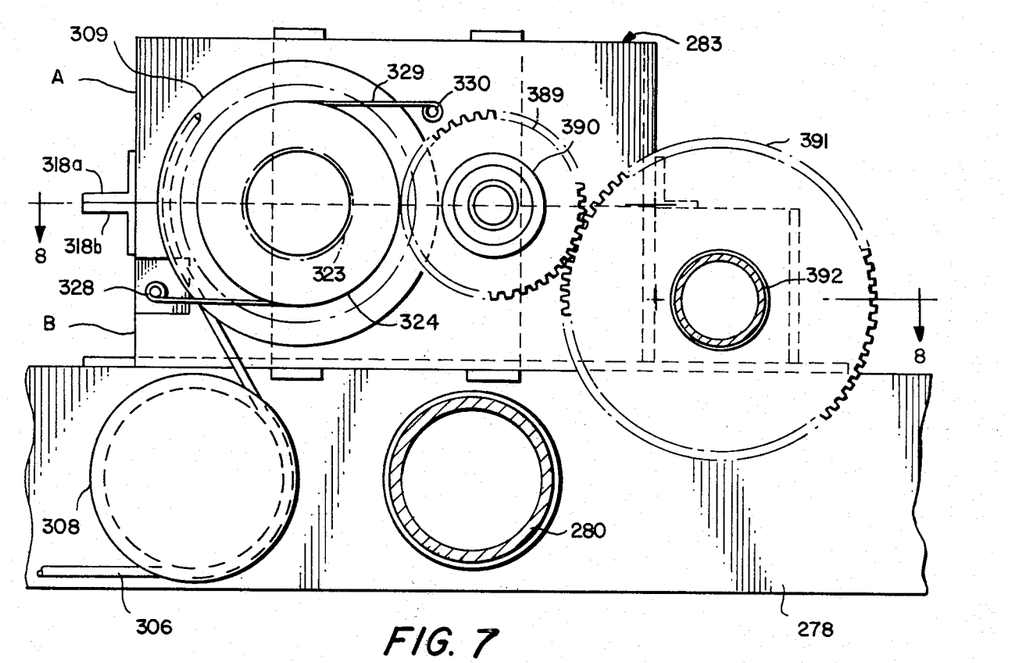
FIG. 7 is a side elevational view of the transmission employed in the vehicle.
Figure 8:
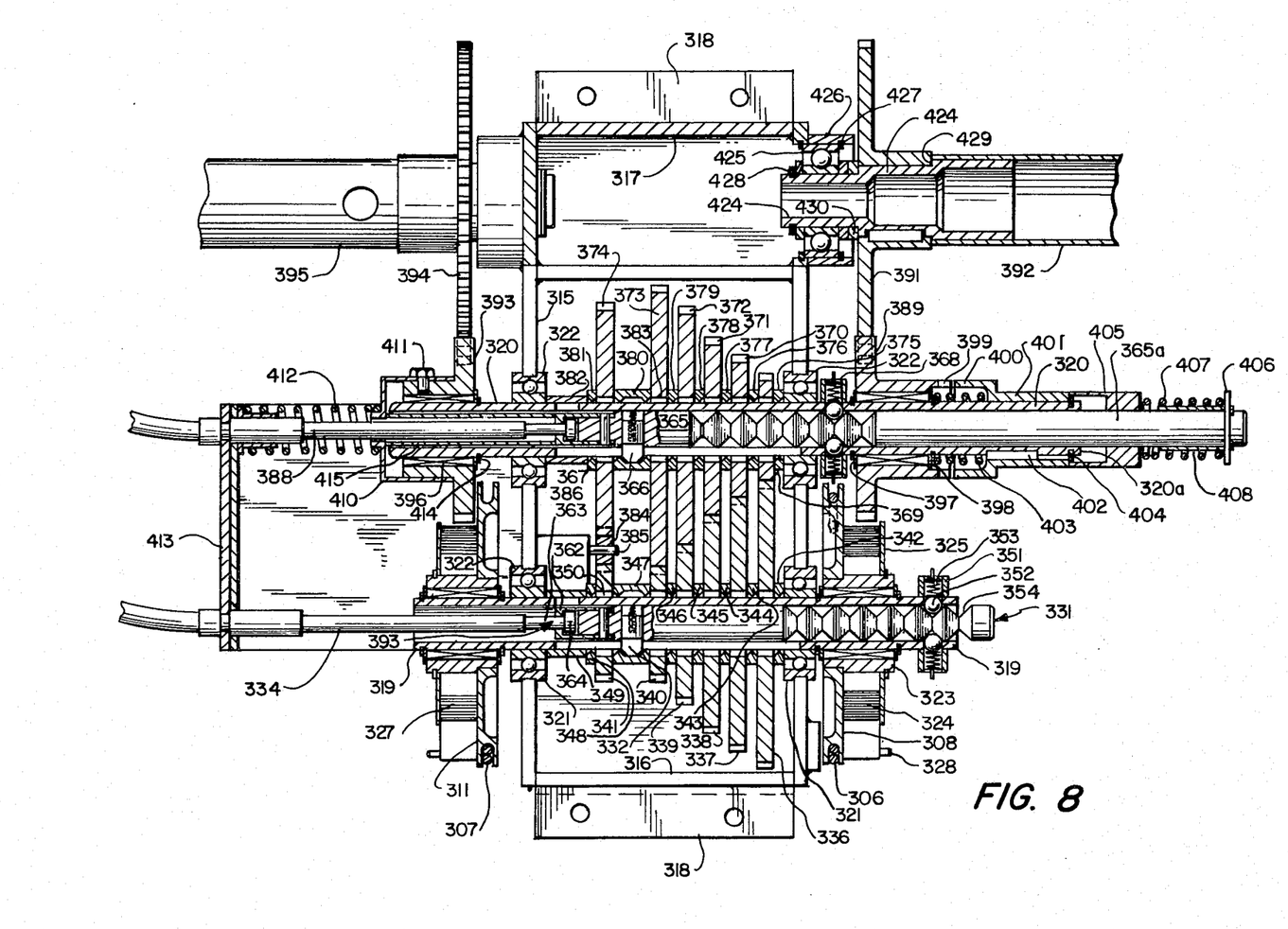
FIG. 8 is a horizontal top plan view, taken generally on line 8—8, FIG. 7, with the top portion of the housing removed, illustrating parts of the transmission in positions occupied when the transmission is neutral.
Figure 9:
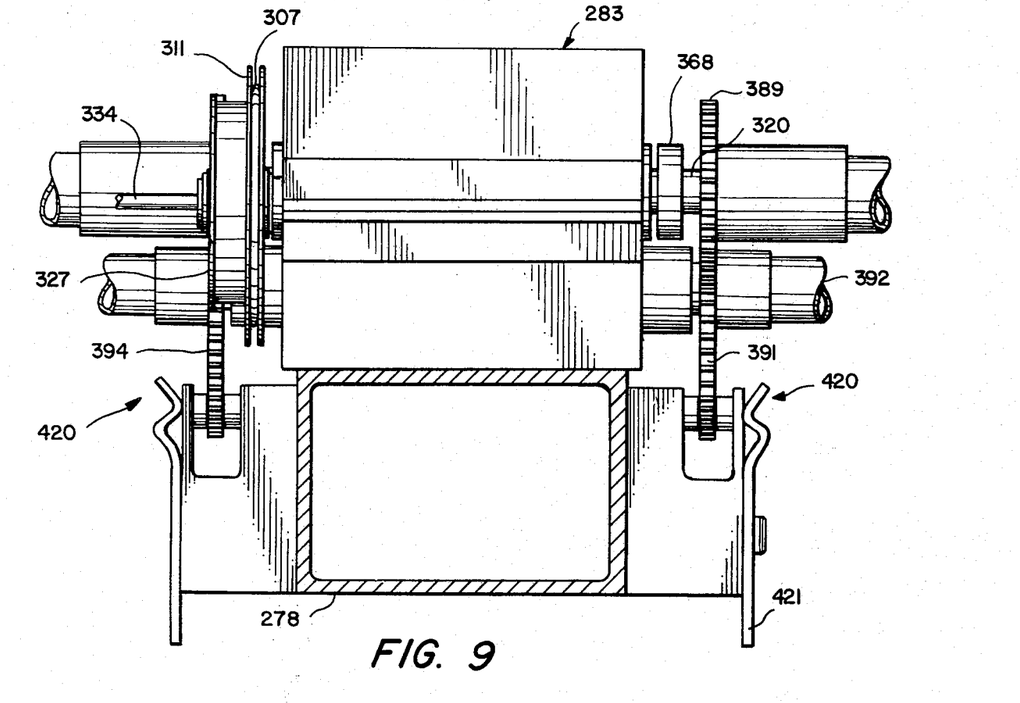
FIG. 9 is an end view of the transmission of FIGS. 7–8A, taken generally on line 9—9, FIG. 2.

As seen in FIGS. 7–9, transmission 283 includes a casing having side walls 315, FIG. 16, a front end wall 316 and a rear end wall 317, the end walls having flanges 318 by which the housing is rigidly mounted on the upper side of longitudinal frame beam 278. The casing is divided into upper and lower sections A and B, as shown in FIGS. 7 and 8 for ease of assembly. The sections are fastened together with brackets 318A and 318B at one end and with a like bracket at the other end. A tubular input shaft 319 and a tubular output shaft 320 are provided, each being of sufficient length to project through and beyond the respective side walls 315. Input shaft 319 is supported for free rotation by ball bearings 321, and output shaft 320 is similarly supported by ball bearings 322. One end portion of input shaft 319 carries the combination of cable reel 308, a one-way clutch 323, and a constant force spiral spring 324, clutch 323 being press-fit into the hut of reel 308 and projecting outwardly therefrom to support a retaining plate 325, spring 324 being located between plate 325 and the adjacent face of reel 308. The opposite end portion of shaft 319 similarly carries the combination of cable reel 311, a one-way clutch 326 and a constant force spiral spring 327. As shown in FIG. 7, the outer end of spiral spring 324 is secured to a pin 328 fixed to and projecting from the adjacent side wall 315. An additional metal strap 329 has one end rivetted to the outer surface of spring 324 in a location 180° from the end of the outer turn of the spring, the other end of strap 329 being secured to a pin 330 fixed to and projecting from the adjacent side wall 315, the strap being tangential relative to the outer turn of the spring. The inner end of spring 324 is secured to clutch 323 and, therefor, to reel 308. The relation of spring 327 to reel 311, clutch 326 and the adjacent side wall 315 is identical to that just described for spring 324.

Cables 306 and 307 have their ends secured to the hubs of the respective reels 309, 311 and are wrapped in the narrow peripheral grooves of the reels. Typically, about 1.5 turns of the cable are wrapped on the reel when the corresponding pedal lever 285, 286 is in its rearmost position and the cable is taut. As will be apparent from FIGS. 2 and 7, the cable passes under the respective idler pulley 308, 310 and then clockwise about the respective reel 309, 311, so that swinging of the pedal lever forwardly to unwind the cable will rotate the reel counterclockwise (as viewed in FIG. 7). Springs 324, 327 are arranged to be wound when the reels turn counterclockwise, and unwinding of the cables therefore stores energy in the springs which, when released, will rotate the reels in a clockwise direction to rewind the cables and return the pedal levers to their neutral position. Clutches 323 and 326 are arranged to connect the reels to shaft 319 when the reels turn counterclockwise, and to free the reels from the shaft when the reels turn clockwise.

Tubular shaft 319 forms part of an input shaft assembly comprising a shift rod 331, FIG. 8, a key 332, a coupling 333 which secures rod 331 to a shift cable 334 but leaves the rod free to rotate about its axis, a detent mechanism indicated generally at 335, forward gears 336–340, reverse gear 341, spacer rings 342–348, and a spacer sleeve 349. Gears 336-341 are spur gears continuously meshed with the respective spur gears of the output shaft assembly as later described. The inner diameters of gears 336-341 are slightly greater than the outer diameter of tubular shaft 319, and the inner periphery of each gear is interrupted by a plurality of angularly spaced notches dimensioned to snugly accommodate the tip of key 332, one such notch being indicated at 350. Rings 342-346 and 348 are flat rings of rigid antifriction material, with outer diameter smaller than the smallest gear and with inner diameter bevelled to constitute cams to be engaged by the tip of key 332 during shifting. Spacer 347 is thick and has an inner peripheral groove of such width as to freely accommodate the tip of key 332, in the fashion seen in FIG. 8, when the transmission is in neutral. Shaft 319 projects well beyond clutch 323, and detent mechanism is carried by the exposed end portion of the shaft. The detent mechanism comprises a collar 351 which surrounds and is fixed to shaft 319, the wall of the tubular shaft having diametrically opposed ports to accommodate two detent balls 352. Collar 351 has diametrically aligned bores accommodating helical compression springs 353 each retained in the respective bore to yieldably bias a different one of balls 352 inwardly into engagement with one of the transverse annular detent grooves 354 provided on shift rod 331. There are seven grooves 354 arranged in a longitudinal series along the shift rod, each adjacent pair of grooves being spaced apart by a distance equal to the sum of the thicknesses of one gear 336-341 and two spacer rings 342-346.

Figure 11:
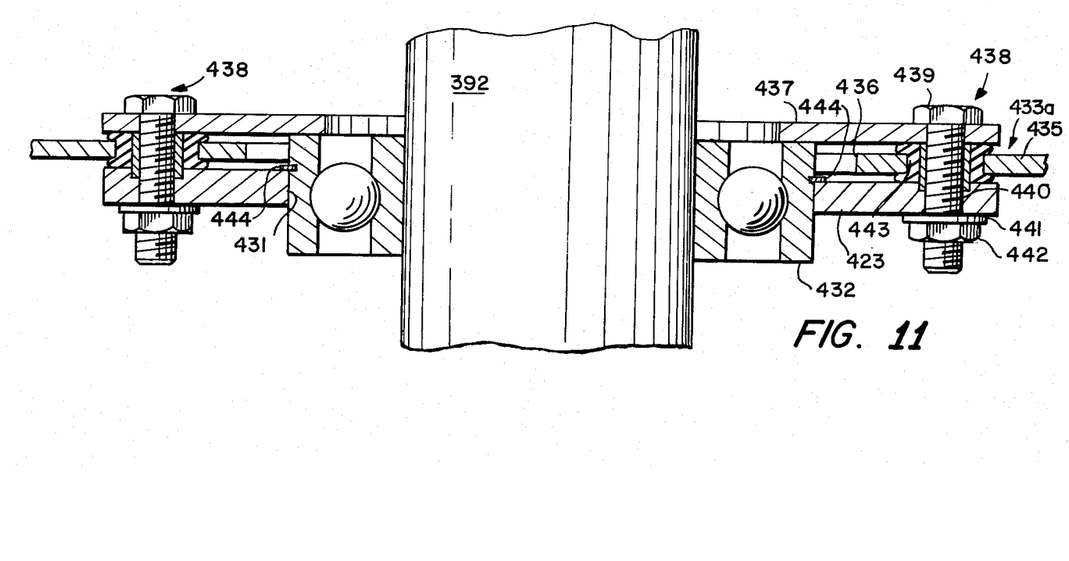
FIG. 11 is an enlarged fragmentary sectional view illustrating the manner in which the body shell is mounted on the vehicle frame and also showing one of the rear axle bearings.

Tubular shaft 319 is provided with a straight longitudinal slot 355 extending throughout the length of the shaft occupied by the gears 336-341. As best seen in FIG. 11, key 332 comprises a main body 356 of a length less than the inner diameter of tubular shaft 319. Body 356 is slidably disposed in a transverse bore in shift rod 331. A blind bore opens through one end of body 356 and accommodates a helical compression spring 357 and a pin 358, the head 359 of pin 358 engaging the exposed end of spring 357 and being rounded for low friction engagement with the inner surface of shaft 319. At its opposite end, body 356 has an integrally formed tip 360 which is of a thickness to be accommodated by slot 355 for free movement therein and a width such that tip 360 can be snugly accommodated in the spaces defined by the combination of a notch 350 in any of gears 336-341 and the bevelled inner peripheral surfaces presented by the two of the spacers 342-348 associated with that gear. Key 332 is installed by being inserted through a port 361 in shaft 319, the port being opposite an end portion of slot 355 in the end portion of the shaft surrounded by spacer sleeve 349.

Opposite detent mechanism 335, shift rod 331 has an end portion of reduced diameter which is surrounded by the cylindrical wall of a cup-shaped connector member 362, the cylindrical wall and the end portion of the rod being rigidly interconnected by a cross-pin, as shown. The end wall of connector member 362 is spaced from the end of rod 331 and provided with a central opening which accommodates an end portion 363 of one flexible shift cable 334. End portion 363 has an enlarged head 364 of transverse dimensions too large to pass through the opening in the end wall of the connector member. The axial dimension of head 364 is such that the head substantially fills the space between the end of rod 331 and the end wall of connector 362.

Figure 8A:
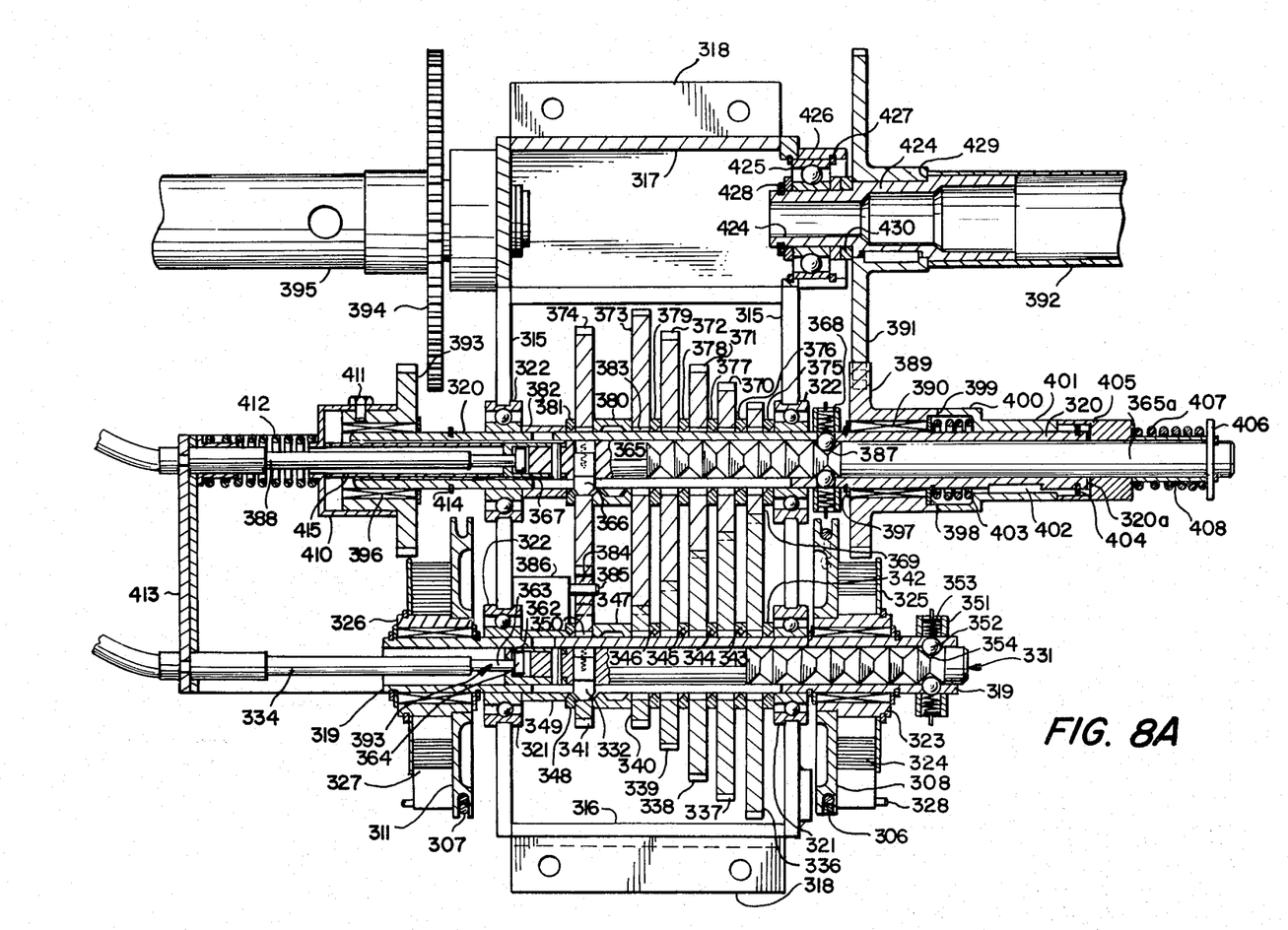
FIG. 8A is a view similar to FIG. 8 but showing parts in positions occupied when the transmission is in reverse.

Accordingly, movement of cable 334, by shift lever 288, FIG. 2, as later explained, is translated into movement of rod 331 axially relative to shaft 319, with key 332 moving with the shift rod. Each detent groove 354 corresponds to a different one of gears 336-340 spacer ring 347, and gear 341. Detent mechanism 335, gears 336-341, ring 347, the grooves 354, and key 332 are so located that, whenever detent balls 352 are engaged in any particular one of the grooves 354, the tip 360 of key 332 will extend into engagement with a corresponding particular one of gears 336-340, spacer ring 347, and gear 341. Thus, will balls 352 engaged in the second (from the right as viewed in FIG. 8) groove 354, tip 360 of the key is engaged in the continuous internal groove of spacer ring 347 so that, shaft 319 being connected to none of the gears 336-341, the transmission is in neutral. If rod 331 is shifted to the left, as viewed in FIG. 8, to bring the detent balls 352 into engagement with the one of the grooves 354 nearest the free end of rod 331, as shown in FIG. 8A, key tip 360 then engages in a notch 350 in reverse gear 341, placing the transmission in reverse. Longitudinal movements of rod 331 causes key tip 360 to engage the camming surfaces presented at the inner peripheries of spacers 342-348 so that, in shifting from one gear to another, or to the "neutral" spacer 347, key 332 is forced transversely of rod 331 to allow tip 360 to pass the corresponding spacer, spring 357 then acting to shift tip 360 outwardly again into engagement with the next notch 350 or the groove presented by "neutral" spacer 347.

Tubular output shaft 320 forms part of an output shaft assembly comprising shift rod 365, key 366, coupling 367, detent mechanism 368, forward gears 369-373, reverse gear 274, spacer rings 375-381, and a spacer sleeve 382. Key 366 is identical to key 332 and cooperates with a slot in shift 320 and notches 383 in gears 369-374 and a groove in neutral spacer ring 380 in the same fashion described with reference to the input shaft assembly. Forward gears 369-373 are in constant mesh with the forward gears 336-340, respectively, of the input shaft assembly. For the reverse gearing, an idler gear 384, supported from the adjacent side-wall 315 by shaft 385 on boss 386, the idler gear being constantly in mesh with gears 341 and 374. Shift rod 365 has seven grooves 387 to cooperate with the balls of detent mechanism 368 as described with reference to the input shaft assembly. Coupling 367 connects the end of shift rod 365 to a shift cable 388.

Outboard of detent mechanism 368, shaft 320 carries a spur gear 389, the gear and shaft being interconnected by a conventional one-way clutch 390. Gear 389 is meshed with a gear 391 keyed to one rear axle 392. On the opposite side of the transmission, shaft 320 carries a spur gear 393 which, as shown in FIG. 8, is meshed with a gear 394 whenever the transmission is in any forward gear or in neutral but, as shown in FIG. 8A, is shifted out of mesh with gear 394 when the transmission is in reverse. Gear 394 is keyed to the second rear axle 395. Gear 393 and shaft 320 are interconnected by a conventional one-way clutch 396 constructed to allow the combination of gear 393 and clutch 396 to slide freely on shaft 320 in axial directions between the two positions shown in FIGS. 8 and 8A.

The axial position of gear 389 on shaft 320 is fixed by conventional retainers at 397, 398, FIG. 8, and shaft 320 projects well beyond gear 389. Shift rod 365 has an elongated plain end portion 365a which projects beyond tip 320a of the output shaft. Since one-way clutches 390 and 396 are oriented to engage between shaft 320 and gears 389 and 393 only when shaft 320 is rotating clockwise (as viewed in FIG. 7) so that gears 391, 394 rotate counterclockwise, to drive the vehicle forwardly, it is necessary to by-pass one of the one-way clutches 390, 396 in order to drive the vehicle in reverse. This is accomplished by providing the hub of gears 389 with a tubular extension formed with two diametrically opposed axially open notches 399, FIG. 8, adapted to receive two diametrically opposed teeth 400 on a by-pass clutch sleeve 401 which is axially slidable on the end portion of shaft 320 but keyed thereto, at 402, so as to rotate with the shaft. The outer portion of sleeve 401 is of reduced diameter to provide a shoulder facing retainer 398, and a helical compression spring 403 is engaged between that shoulder and retainer 398 to bias sleeve 401 outwardly against a retaining ring 404 on shaft 320a. An actuating sleeve 405 is carried by portion 365a of the shift rod and has a tubular skirt surrounding retaining ring 404 and engaging the outer end of clutch sleeve 401. A ring 406 is secured to portion 365a of the shift rod near the end thereof, and a helical compression spring 407 is interposed between the end of actuating sleeve 405 and ring 406. A motion limiting sleeve 408 embraces rod portion 365a between ring 406 and actuating sleeve 405 and is shorter than the relaxed length of spring 407. Spring 407 is stronger than spring 403 and is relaxed when rod 365 is in the neutral position.

For all positions of shift rod 365 save reverse, spring 403 maintains actuator sleeve 405 and clutch sleeve 401 in their inactive positions (FIG. 8) so that teeth 400 cannot engage in notches 399. Under these conditions the transmission is effective to drive either rear axle in a direction to move the vehicle forwardly, and the one-way clutches 390, 396 are effective to disconnect either rear axle from the transmission if that axle is rotating counterclockwise (as viewed in FIG. 7) more rapidly than shaft 320 is rotating clockwise. Thus, clutches 390, 396 provide both "free wheeling" and a differential-like action whenever the transmission is in any forward gear or neutral. When rod 365 is moved to the reverse position shown in FIG. 8A, the resulting compressive force on spring 407 causes actuating sleeve 405 to move clutch sleeve axially toward gear 389, with teeth 400 engaging in notches 399 so that shaft 320 is connected directly to gear 389 via key 402 and clutch sleeve 401, one-way clutch 390 thus being ineffective. As rod 365 reaches the position seen in FIG. 8A, the end of sleeve 408 engages the end of actuator sleeve 404 to lock clutch sleeve 401 in its engaged position. With the parts in the positions shown in FIG. 8A, spring 403 is compressed. Since one-way clutch 390 has now been by-passed, operation of either or both pedal lever 285, 286 will drive gear 391 and rear axle 392 in directions to move the vehicle in reverse.

With reverse power applied to one rear wheel 277 via axle 392, it is possible for the other rear wheel to exceed the rotational velocity of the driven wheel, such a condition arising if the vehicle is being turned as it is driven in reverse. Under those circumstances, the nondriven rear wheel would, in effect, drive the transmission via clutch 396 so long as gears 393 and 394 are meshed, and the end result would be that the nondriven rear wheel would lock and skid. To avoid this, gear 393 is shifted out of mesh with gear 394, leaving axle 395 completely free to rotate, whenever the transmission is shifted to reverse.

The hub of gear 393 is embraced by the cylindrical wall of a cup-shaped member 410 which is secured rigidly to the hub, as by set screw 411. A compression spring 412 is engaged between the transverse wall of member 410 and bracket 413, which positions cables 334, 388. Surrounding cable 388, spring 412 urges the combination of gear 393 and oneway clutch 396 against a retaining ring 414, as seen in FIG. 8, whenever rod 365 is in its neutral or any forward position. Gear 393 is meshed with gear 394 under these circumstances. A rigid sleeve 415, surrounding the end portion of cable 388 and located within shaft 320, is interposed between coupling 367 and the transverse wall of member 410, the length of sleeve 415 being equal to the space which exists between coupling 367 and the transverse wall of member 410 when rod 365 is in its neutral position. Whenever rod 365 is moved to its reverse position, sleeve 415 is moved with the shift rod, causing gear 393 to be shifted outwardly on shaft 320 until that gear is out of mesh with gear 394, as shown in FIG. 8A, and spring 412 is compressed. When rod 365 is returned to its neutral position, spring 412 relaxes, urging the combination of gear 393 and clutch 396 into engagement with retaining ring 414, gear 393 again being meshed with gear 394.

While all gear sets, e.g., gears 336 and 369, within the transmission are in constant mesh, only that pair of gears selected by the shift mechanism is locked to the shafts 319, 320. Accordingly, for any active condition of the transmission, only one pair of gears is driven, and the remaining transmission gears "float," so that there is a minimum power loss within the transmission.

Figures 5, 6:
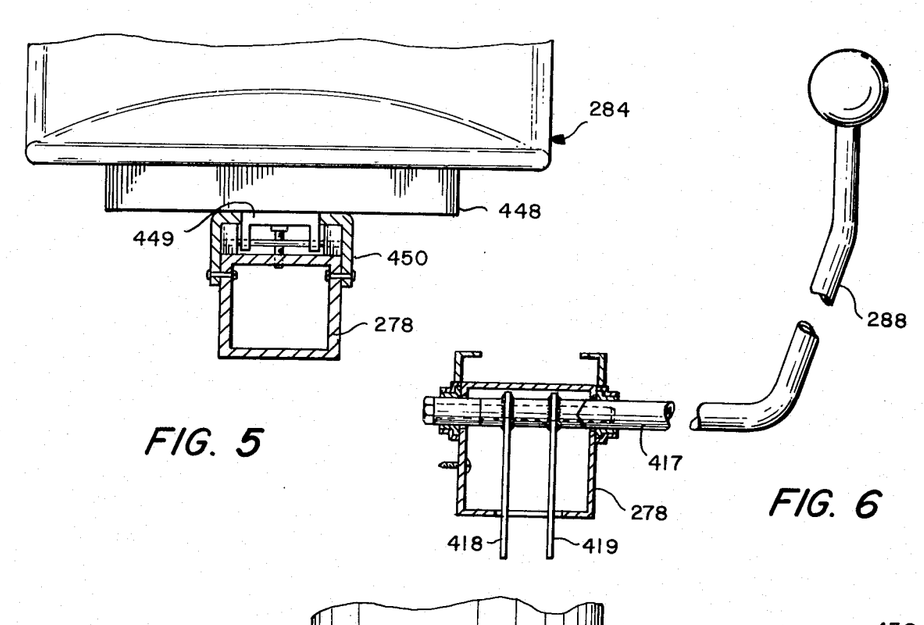

From bracket 413, shift cables 334, 388 are led to beam 278 and forwardly thereunder to the location of gear shift lever 288. As shown in FIG. 6, shift lever includes a horizontal portion 417 which extends through the sidewalls and is journalled on beam 278. Two mutually parallel lever arms 418, 419 located within beam 278 are secured rigidly to portion 417 and depend therefrom, passing through a suitable slot in the bottom wall of the beam and projecting therebelow. The forward end of cable 334 is secured to lever arm 418. The forward end of cable 388 is secured to lever arm 419. Cables 334 and 388 are of the same effective length and, since movement of arms 418, 419 is sinultaneous, the two shift rods 333 and 365 are moved simultaneously, in the same direction and through the same distance, whenever the operator moves the shift lever 288. Though the actuating movements applied to shift rods 333, 365 by the shift cables are not entirely precise, the small differences are compensated for by the action of the detent mechanism 351 and 368.

For braking, two conventional disc brakes 420, FIGS. 2 and 9, of the general type disclosed in U.S. Pat. No. 3,358,793, issued Dec. 19, 1967 to Hollangel et al, are employed. Each brake 420 employs a different one of the gears 391, 394 as the brake disc. The brakes are mounted on the respective sides of beam 278 and operated by pivot arms 421 through brake cables 422 which extend forwardly and are connected to brake lever 287 within the confines of beam 278.

Referring to FIGS. 3, 8 and 11, each rear axle 392, 395 is supported at its inner end by the transmission housing and thus by beam 278, and at an intermediate point by one of the bracket plates 423 rigidly secured to the respective ends of transverse frame member 280.

Since the supports for both rear axles are the same, only that for axle 392 will be described. The inner end ferrule 424 of the axle is journalled in a ball bearing 425 carried by a tubular mount 426 secured to side plate 315 of the transmission housing. Bearing 425 is restrained against axial movement relative to plate 315, by retaining rings 427. The axle is restrained against axial movement by retaining ring 428 and a cooperating shoulder on ferrule 424. Gear 391 is keyed to ferrule 424 and is engaged between a shoulder 429 on the ferrule and a spacer ring 430, so that the axial position of the gear is fixed.

Brackets 423 are in the form of flat plates welded each to a different end of member 280 and lying in substantially vertical planes parallel to the main frame beam 278. In a location aligned horizontally with the center of bearing 425, bracket 423 has a circular opening 431, FIG. 11, snugly accommodating a ball bearing 432. The body shell 433, FIGS. 1 and 2 of the vehicle is of polymeric sheet material and comprises a lower thermoformed portion 433a and an upper thermoformed portion 433b, the two portions having mating peripheral flanges secured together, as by bolts 434, FIG. 2. Lower shell portion 433a has an upright side wall a bottom wall 433b which extends beneath main frame beam 278, and portion 435, FIG. 11, provided with opening 436 within which bearing 432 is disposed, opening 436 being larger than the bearing so that the bearing does not engage the body shell. An outer plate 437 is provided, shell portion 435 extending between bracket 423 and plate 437. The bracket and plate are secured together by a plurality of fasteners, indicated generally at 438, arranged in a circular series spaced outwardly from opening 436. Each fastener 438 comprises a bolt 439, a spacing sleeve 440, a washer 441, a nut 442 and a resiliently compressible grommet 443. Aligned openings are provided in plate 437, shell portion 435, and bracket 423, the opening in plate 437 snugly embracing the shank of bolt 439, the opening in shell portion 435 being markedly larger than the outer diameter of sleeve 440, and the opening in bracket 423 snugly embracing the sleeve. Grommet 443 is interposed between sleeve 440 and the wall of the opening in shell portion 435 and is of a relaxed length greater than the space between plate 437 and bracket 420 in the completed assembly. The nut and bolt are tightened until sleeve 440 is clamped between plate 437 and washer 441, with the washer bearing against the inner face of bracket 423. Grommet 443 is compressed axially and, as a result, is placed in compression between sleeve 440 and the surrounding wall of the opening in shell portion 435. The outer ring of bearing 432 is transversely grooved and provided with a retaining ring 444 which, in the completed assembly, bears against the outer face of bracket 423, the distance between ring 444 and outer end of bearing 432 being such that the outer end of the bearing is forced against the inner face of plate 437, so that the bearing is rigidly retained on bracket 423.

At the front of the vehicle, transverse frame member 279 has rigidly secured thereto at each end a bracket plate 445, the lower body shell portion 433a being secured to plates 445 by plates 437 and fasteners 438 as just described with reference to FIG. 11. Accordingly, the body shell is attached to frame 275 only via the resilient grommets 443 and brackets 423, 445.

Seat 284 is mounted on main frame beam 278 by means of a transverse member 448, FIGS. 2 and 5, a longitudinally extending central member 449 of inverted U-shaped transverse cross-section, member 449 being secured rigidly to the bottom of member 448, and two longitudinal members 450 which are of L-shaped transverse cross-section and are each rigidly secured to beam 278 so that the long arm of the L overlies one side of the beam and the short arm of the L is spaced above the top of the beam. The width of member 449 is such that the same is accommodated in the space immediately above the top wall of beam 278 and between members 450. At its forward end, member 449 is provided with a cross-shaft 451 the ends of which project outwardly from member 449. A nylon block 452 is provided at each end of shaft 451, each block filling the space between the horizontal flange of the corresponding member 450 and the top wall of beam 278. The seat can thus be pivoted about the axis of shaft 451 and moved forwardly or rearwardly along beam 278, within the length of members 450. To lock the seat to beam 278 against longitudinal movement, a pin 453 is rigidly secured to member 449 near the rear thereof and projects downwardly therefrom, and the top wall of beam 278 is provided with a plurality of holes spaced lengthwise of the beam and each dimensioned to accommodate the pin.

What is claimed is:

1. In an occupant-propelled vehicle, the combination of
 a rigid frame comprising
  an elongated, central, longitudinally extending main frame member, and
  rigid transverse frame means secured rigidly to one end portion of said main frame member and including end portions equally spaced from said main frame member;
 two generally flat brackets,
  each of said brackets being rigidly secured to a different one of said end portions of said transverse frame means,
  each of said brackets having an axle-accommodating opening and said brackets being rigidly supported by said transverse frame means in locations such that said axle-accommodating openings are coaxially aligned transversely of the frame;
 first and second antifriction rotary bearings each mounted on a different one of said brackets and having their rotational axis coaxially aligned transversely of the frame;
 third and fourth antifriction rotary bearings;
 mounting means rigidly secured to said main frame member in a location adjacent said transverse frame means,
  said third and fourth antifriction rotary bearings being mounted by said mounted means in coaxial alignment with said first and second bearings;
 two mutually independent axles,
  each of said axles having its inner end portion journalled in a different one of said third and fourth bearings,
  said axles each extending outwardly through the corresponding one of said first and second bearings and having its outer end located outboard of the corresponding one of said brackets;
 two wheels each fixed to the outer end of a different one of said axles; and
 a body shell secured to said brackets.

2. The combination defined in claim 1 and further comprising
  second rigid transverse frame means secured rigidly to the other end portion of said main frame member;
  two additional generally flat brackets each rigidly secured to a different end portion of said second transverse frame means and lying in a generally upright plane; and
  two steerable wheels each mounted on a different end portion of said second transverse frame means;
  said body also being secured to said two additional brackets.

3. The combination defined in claim 2, wherein
  said body shell is of self-supporting sheet material and comprises
    a bottom portion, and
    a top portion,
  said bottom portion having a bottom wall, which extends below said frame, and generally upright side walls which include attachment portions located outwardly of and extending across said brackets, the ones of said attachment portions which are located at said first-mentioned brackets being provided with openings through which said axles pass.

4. The combination defined in claim 3, wherein
  said sheet material is rigid polymeric material, and
  the combination further includes
  a plurality of plates each spaced outwardly from and cooperating with a different one of said brackets,
    said attachment portions of said side walls extending into the space between the corresponding ones of said brackets and plates; and
  a plurality of fasteners securing said plates rigidly to the respective ones of said brackets.

5. The combination defined in claim 4, wherein
  each of said fasteners is constructed and arranged to provide direct metal-to-metal engagement from the plate through the fastener to the bracket, each of said fasteners comprising a resilient grommet,
  said attachment portions of said body portions of the shell having openings through which the respective fasteners extend, said grommets each being located in a different one of said openings and serving to interconnect said attachment portions and said fasteners.

6. The combination defined in claim 5, wherein
  said bottom and top portions of said body shell have mating edges lying generally in a plane located above said frame,
  the combination further comprising
  fastener means releasably securing said mating edges together.

7. The combination defined in claim 1 and further comprising
  a change speed transmission having opposed upright side walls,
    said transmission being rigidly mounted on said main frame member adjacent said first-mentioned transverse frame means,
    said mounting means for said third and fourth bearings comprising portions of the side walls of said transmission housing.

8. The combination defined in claim 7, wherein
  said first-mentioned transverse frame means comprises an integral tubular member;
  said main frame member is a tubular member having upright side walls;
  said tubular member of said first-mentioned transverse frame means extends transversely through said main frame member;
  said transmission is mounted on the top of said main frame member; and
  said body shell includes
    a generally horizontal bottom wall extending beneath and adjacent to said main frame member.

* * * * *

UNITED STATES PATENT OFFICE
CERTIFICATE OF CORRECTION

PATENT NO. : 3,920,263
DATED : November 18, 1975
INVENTOR(S) : Robert L. Bundschuh and Lionel C. Martin It is certified that error appears in the above-identified patent and that said Letters Patent are hereby corrected as shown below:

On the title page in the left-hand column lines [75] and [73] should read as follows:

[75] Inventors: Robert L. Bundschuh and Lionel C. Martin, both of West Simsbury, Conn.

[73] Assignee: Mitsui Mining & Smelting Co., Ltd., Tokyo, Japan.

Signed and Sealed this second Day of March 1976

[SEAL]

Attest:

RUTH C. MASON
Attesting Officer

C. MARSHALL DANN
Commissioner of Patents and Trademarks